Aug. 25, 1964     R. D. MEDLEY     3,145,628

SHAFT STABILIZER

Filed Aug. 3, 1962

*INVENTOR.*
RONALD D. MEDLEY
BY

ATTORNEY

United States Patent Office 3,145,628
Patented Aug. 25, 1964

3,145,628
SHAFT STABILIZER
Ronald D. Medley, Overland Park, Kans., assignor to Consolidated Thermoplastics Company, Stamford, Conn., a corporation of Delaware
Filed Aug. 3, 1962, Ser. No. 214,743
2 Claims. (Cl. 92—166)

The present invention is directed to a simple device for stabilizing a conventional piston and piston rod assembly against rotation relative to the cylinder in which the piston reciprocates. Specifically, my invention is a device which can be utilized on known piston and cylinder assemblies by an inexpensive modification of the piston and cylinder to achieve a nonrotatable piston.

Piston and cylinder assemblies have various uses in industry and it is frequently necessary to prevent rotation of the piston and integral piston rod during reciprocation of the piston within the cylinder. Illustrative of uses for nonrotatable piston rods are cut-off devices for the parison on blow molding machines, pusher devices on conveyers, etc. Many specially constructed piston and cylinder assemblies are available on the market today, however most of these assemblies require special fabrication and thus are expensive in initial cost and maintenance in the event of a breakdown of the assembly. Illustrative of the known devices to prevent rotation of the piston within the cylinder are noncircular pistons reciprocating in noncircular cylinders. These known pistons and cylinders are normally oval or modified hexagon configurations. Difficulties in providing new piston rings and packing are prevalent with these nonrotatable pistons. Noncircular piston rods and key-in-slot rods are available, but very expensive due to fabrication costs and sealing problems.

In the drawings I have shown a present preferred embodiment of my invention in which.

Briefly, my invention is directed to a piston and cylinder assembly having a cylindrical housing, a piston movable within the housing in a reciprocating motion, a piston rod connected to the piston and extending longitudinally outwardly from the housing for actuation of a desired mechanism, air or fluid pressure supplying means for reciprocating the piston within the housing, and a stationary rod positioned within the housing and mounted through an opening in the piston, the stationary rod being substantially parallel to and offset radially from the piston rod to maintain the piston and rod nonrotatable during reciprocation. The stationary rod extends between and is fixed to plates closing the ends of the cylinder housing.

Figure 1:
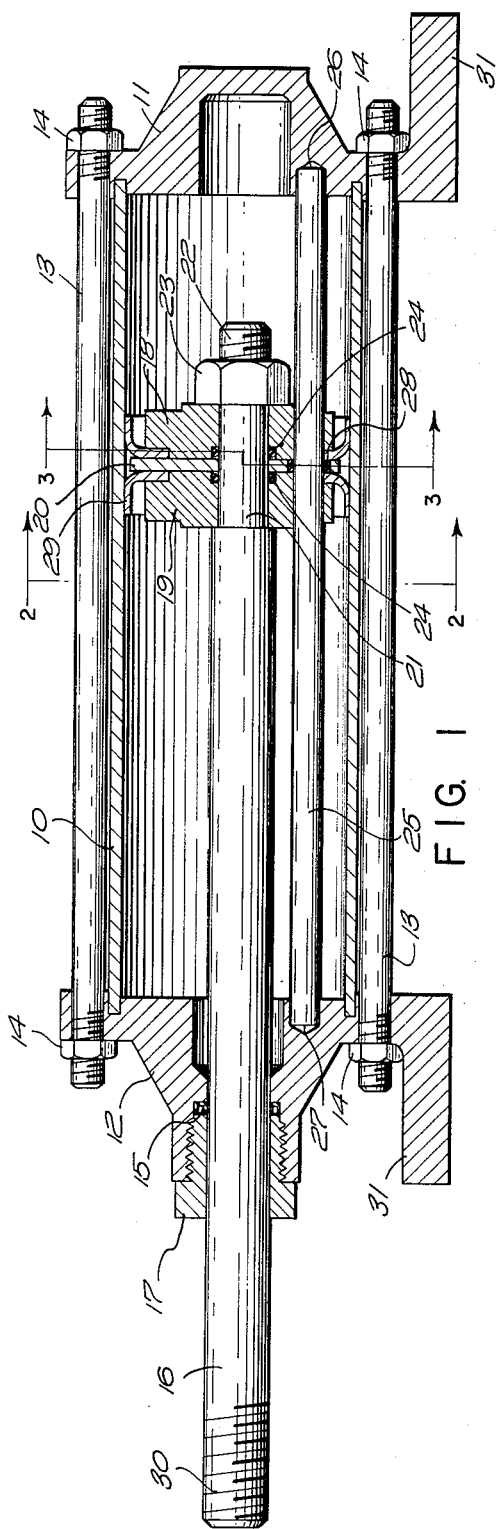
FIGURE 1 is a longitudinal cross section through the piston and cylinder assembly showing my invention.
Figure 2:
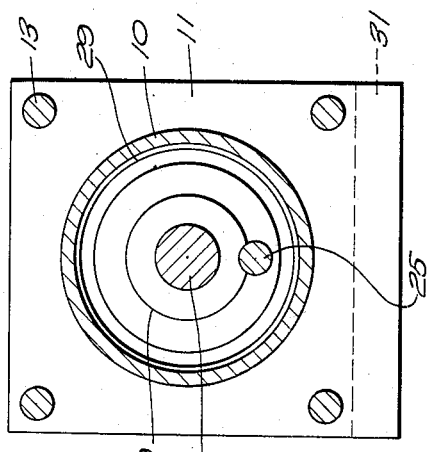
FIGURE 2 is a cross section taken on line 2—2 of FIGURE 1.
Figure 3:
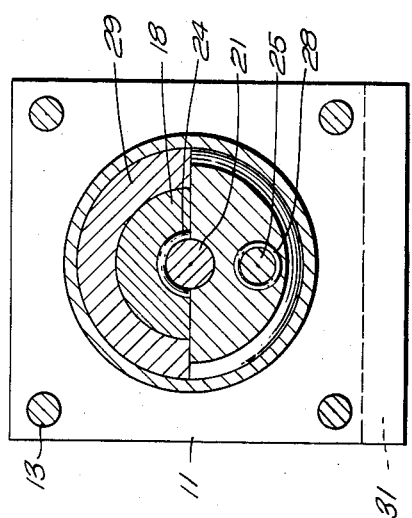
FIGURE 3 is a cross section taken on line 3—3 of FIGURE 1.

Referring specifically to FIGURE 1, a conventional piston and cylinder assembly is shown with my improvement for stabilizing the piston rod and piston against rotation during reciprocation. A cylindrical housing 10 is fitted into a circular groove in each end plate 11 and 12. The end plates 11 and 12 are maintained in tight sealing relationship with the housing 10 by threaded rods 13 which pass through openings in the end plates and receive nuts 14 on their threaded ends. End plate 12 contains a central opening which slidably receives a piston rod 16. Packing 15 is positioned in a recess in end plate 12 and a stuffing nut 17 maintains the packing 15 tightly against the rod 16 to provide a fluid tight seal between the rod 16 and end plate 12.

The piston includes two cylindrical discs 18 and 19 positioned in face to face relationship with a spacer disc 20 between them. A necked portion 21 of the piston rod 16 passes through an opening in each of the discs 18, 19 and 20. The necked portion 21 has a threaded end 22 which receives a locking nut 23 for maintaining the discs 18, 19 and 20 tightly together. Packing or O-rings 24 are positioned in recesses in the inner faces of the discs 18 and 19 and are tightly held in place in the recesses by the locking nut 23 in the manner shown in FIGURE 1. The packing or O-rings 24 provide a fluid tight seal around the rod 16.

The discs 18, 19 and 20 contain openings in the lower portion which are in alignment and receive a stationary rod 25. One end of rod 25 is positioned within opening 26 in end plate 11 and the other end in opening 27 in end plate 12. The rod 25 is slidably received in the aligned openings in discs 18 and 19. The aligned opening in spacer disc 20 is larger than the opening in the discs 18 and 19 and receives a packing or O-ring 28 which is positioned tightly around the entire circumference of rod 25 to maintain a fluid or air tight seal between the disc 20 and rod 25.

Suitable fluid pressure supplying means (not shown) are provided for the right and left chambers as viewed in FIGURE 1, that is, to the right and left of the piston. Preferably the piston and cylinder assembly used according to my invention is a double acting piston with a positive fluid or air pressure source on both sides of the piston, but can be activated by a single fluid source on one side of the piston with a spring return mechanism as is well known.

Flexible piston rings 29 are provided continuously about the entire periphery of the discs 18 and 19 and extend outwardly into engagement with the inside wall of cylinder 10 to maintain a fluid tight seal between the piston rings and the inner wall of cylinder 10. The flexible piston rings 29 are clamped into recesses in the inner face of disc 18 and 19 by the locking nut 23.

The piston rod 16 preferably includes a threaded end 30 for attachment to a mechanism for actuation by the piston and cylinder assembly but various other types of well known attachments may be used.

In operation, fluid pressure is supplied to the right chamber of the cylinder as viewed in FIGURE 1 thereby moving the piston rod 16 toward the left. The discs 18 and 19 slide along rod 25 and are prevented from any rotary motion.

In retracting the piston and rod 16 fluid pressure is introduced into the left hand chamber as viewed in FIGURE 1 and exhausted from the right hand chamber thereby moving the piston and piston rod 16 toward the right in FIGURE 1. Likewise on this return stroke the piston and piston rods are prevented from rotary motion by the rod 25.

The cylinder housing is attached to a stationary support by flanges 31 attached to the end plates 11 and 12 but, of course, the cylinder can be attached to a support in any well known manner as is conventional in the art.

As observed from the above description, my invention can be adapted to many piston and cylinder assemblies presently on the market and merely requires the boring of the aligned holes 26 and 27 in the end plates 11 and 12 respectively and boring aligned holes in discs 18, 19 and 20; positioning rod 25 in the holes, and reassembling the cylinder.

While I have described a present preferred embodiment of my invention, it may be otherwise embodied within the scope of the following claims.

I claim:

1. A shaft stabilizer comprising a cylindrical elongated housing, a member affixed to and closing each end of the housing, a central opening in one of said members; a piston reciprocable in said housing; means supplying pressure to said housing to reciprocate said piston; a piston rod affixed centrally to said piston and slidable in the central opening in said member upon reciprocation of said piston thereby normally permitting rotation of the piston and piston rod within the housing; a rigid stationary rod positioned in said housing, one end of the rod being affixed to one member, the other end of the rod being affixed to the other of said members; an opening in said piston radially displaced from the center of the piston; said stationary rod passing through the opening in the piston, said piston sliding on the stationary rod upon reciprocation of the piston; said piston including two circular discs positioned in face-to-face relationship, a spacer between said discs; fastening means engaged with the piston rod to maintain the discs tightly against the spacer; an opening in said spacer in alignment with said opening in the piston; said stationary rod passing through said openings, the opening in the spacer being slightly larger than the cross section of the stationary rod, gasketing members positioned around and tightly engaging the stationary rod, said gasketing means being positioned in the opening in the spacer and squeezed tightly around the stationary rod and between said discs by said fastening means.

2. A shaft stabilizer according to claim 1 wherein the peripheral portions of both discs are recessed immediately adjacent said spacer; flexible piston rings positioned in the recessed portion and extending completely around the discs to maintain a sliding seal between the piston and housing, said piston rings being clamped between the discs and spacer by said connecting means.

References Cited in the file of this patent

UNITED STATES PATENTS

| | | |
|---|---|---|
| 1,089,408 | Ganderton | Mar. 10, 1914 |
| 2,910,047 | Plummer | Oct. 27, 1959 |
| 2,974,646 | Miller et al. | Mar. 14, 1961 |
| 2,987,888 | Crowell | June 13, 1961 |